US007266280B2

(12) United States Patent
Swenson et al.

(10) Patent No.: US 7,266,280 B2
(45) Date of Patent: Sep. 4, 2007

(54) CABLE STORAGE DEVICE PROVIDING CONTINUOUS ADJUSTABILITY WITH CONTROLLED BEND RADIUS

(75) Inventors: Steven Swenson, San Jose, CA (US); Gary R Trott, San Mateo, CA (US); Paul Welch, Cupertino, CA (US); Don Chiu, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 147 days.

(21) Appl. No.: 09/811,310

(22) Filed: Mar. 16, 2001

(65) Prior Publication Data

US 2002/0131749 A1   Sep. 19, 2002

(51) Int. Cl.
*G02B 6/00* (2006.01)
(52) U.S. Cl. ..................................... 385/135
(58) Field of Classification Search ................ 385/134, 385/135
See application file for complete search history.

(56) References Cited

U.S. PATENT DOCUMENTS

| 4,886,336 A | 12/1989 | Deusser et al. | |
| 5,167,001 A * | 11/1992 | Debortoli et al. | ........... 385/135 |
| 6,144,792 A | 11/2000 | Kim et al. | |
| 6,496,638 B1 * | 12/2002 | Andersen | ..................... 385/135 |
| 6,909,834 B2 * | 6/2005 | Tomino et al. | .............. 385/135 |

FOREIGN PATENT DOCUMENTS

| JP | 59-63321 | 4/1984 |
| JP | 59-134111 | 9/1984 |
| JP | 62-65884 | 3/1987 |
| JP | 10-133035 A | 5/1998 |
| JP | 2001-264549 A | 9/2001 |

* cited by examiner

*Primary Examiner*—Khiem Nguyen

(57) ABSTRACT

A device for storing and deploying cable, including but not limited to optical fiber cable. The device includes a substantially planar bottom support surface having juxtaposed thumb segments and an intervening finger segment. An outer wall is affixed to the bottom surface about its perimeter and extends upwardly therefrom. A substantially circular guide wall is disposed on the bottom surface extending upwardly therefrom. A substantially circular inner wall is concentrically arranged with respect to the guide wall. A top flange is joined to the support surface by the outer wall and, together with the thumb segments, form entry and exit ports for the cable. The guide wall and the inner wall define a guide track that is dimensioned so as to enable continuous adjustment of variable lengths of cable in an area of the device bounded by the guide track, the outer wall and a transverse barrier that extends the length of the finger segment. The guide track operates to secure the cable in the device once an appropriate length has been accumulated or deployed.

17 Claims, 5 Drawing Sheets

CABLE STORAGE DEVICE PROVIDING CONTINUOUS ADJUSTABILITY WITH CONTROLLED BEND RADIUS

BACKGROUND OF THE INVENTION

1. Field of the Invention

The invention relates to optical fiber technology and, more particularly, to a device for storing and deploying optical fiber cable in a manner that enables continuous adjustment to the length of optical fiber cable that may be stored and/or deployed.

2. Description of the Related Art

Largely because of the demonstrated capacity to transport prodigious quantities of data, optical fiber cable finds extensive application in telephony, computer systems and other applications where large quantities of data or information must be conveyed. However, unlike metallic conductors, optical fibers are brittle and may fracture if bent beyond a minimum bend radius. Even at bending radii greater than that at which cracking or breaking may occur, performance of the optical cable may nonetheless be degraded as a result of optical loss within the fibers that are subjected to the bending. For example, although the bend radius that may cause cleavage of fiber optic cables used in telecommunications applications may be approximately 12 mm, degradation in performance may occur at larger radii, starting at a bend radius of approximately 25 mm. In the discussion to follow, the bend radius at which degradation in optical performance becomes noticeable will sometimes be referred to as the "minimum bend radius".

Further, since a cable may be covered or enclosed in a sheath, or since only selected fibers in a cable may break, a break may not be detected until there has been loss of data. At that point, the break may then be inconvenient to localize and may be both difficult as well as expensive to correct. It is, therefore, desirable that when such cables are handled, suitable constraints be observed so as to assure that the cable is not bent at a radius that violates an applicable minimum bend radius restriction.

A common situs for a break or other degradation in a fiber optic cable as a result of overbending may be found at switching panels in a telephone carrier's central office. Typically, a large number of interconnect switching or other types of circuits are mounted adjacent each other in a panel, with cables extending from a selected side or sides of each of the circuits. In one application, there may be multiple cables, each extending from each circuit. Some of the cables may represent inputs and others outputs for the circuit, and it is desirable that cables exiting a given circuit be able to extend toward either end of the panel to interconnect with other circuits on the panel or with circuits and locations external to the panel. However, to avoid undesirable signal degradation or discontinuities occurring in the cables, it is important that in extending the cables from the circuit board through the panel the cables not be excessively stressed at any point along the path of travel. Existing systems for managing and controlling the distribution of fiber optic cables in a switching panel generally do not provide specific guides that assure that cables are not overbent as they are run through the panel, while concurrently accommodating multiple cables and permitting multiple routing directions. Similar problems, also unresolved, may also be germane to other transmission media, such as coaxial cable systems, where characteristic impedance may be altered or where wire or shielding may be cracked or broken if excessive bending occurs.

Typical existing devices permit optical fiber cable to be wound only around a fixed radius. This radius is usually 27 mm or greater, so as to minimize signal loss due to the bending of the fiber. These devices tolerate only discrete incremental take-up adjustments, roughly concomitant to the perimeter of the geometry around which the fiber is wound. Some devices incorporate multiple paths to afford at least a limited adjustment of the take-up length. In order to route a length of optical fiber cable from source to destination often requires exceeding the minimum bend radius, and sometimes stresses the cable beyond physical limits. In addition, many known devices incorporate multiple capture tabs to contain the fiber within the defined paths. The capture tabs are necessary in most systems, but repetitive use required by trial and error causes fatigue and breakage in the cable and in the tabs themselves.

Accordingly, what is desired is a device that promotes convenient protection, storage deployment of optical fiber cable. The device will accommodate the accumulation of a generous length of cable so that sufficient cable is on hand to satisfy a continual need to make and modify connections to and between telecommunications equipments with interconnection panels, such as optical switches, multiplexers, digital cross-connects and the like. Preferably, the device will facilitate continuous adjustment in the length of cable that is stored and/or deployed, thereby responding to the myriad configurations encountered in the length of cable distributed by cable suppliers, manufacturer equipments and carrier installation environments. Repeated requirements to add or remove cable from the device are to be minimized, if not eliminated. The device provides a space for the fibers to accumulate in a controlled manner, always observing the minimum bend radius. That is, the device allows lengths of cable to be added to or withdrawn from the space to conform to installation requirement. The designer can define a path from source to destination with the proper bend radius, confident that the device will prevent over bending. Manufacturing tolerances may then be relaxed to provide economy without sacrificing optimal performance.

SUMMARY OF THE INVENTION

The above and other objects, advantages and capabilities are achieved in one aspect of the invention by an optical fiber storage and deployment canister that comprises a substantially planar base having a first thumb segment, a second thumb segment and a finger segment disposed between the first and second thumb segments. The finger segment of base extends beyond the extremities of the thumb segments, and the base exhibits a bottom perimeter that extends between the respective extremities of the first and second thumb segments. An outer wall extends upwardly along the bottom of the base, and a bifurcated transverse barrier extends transversely across the finger segment at an end of the finger segment. A reel is disposed at about a center position on the base and comprises a first substantially circular guide track wall having a first diameter and having a second substantially circular guide track wall arranged concentric to the first guide track wall and having a second diameter that is greater than the first diameter. The guide track is defined by the first and second guide track walls and provides an entry slot and an exit slot for optical fiber cable. A top flange comprises a first flange segment joined to the bifurcated transverse barrier and a second flange segment joined to the outer wall. The top flange and the first thumb segment form an entry port for optical fiber cable and the top flange and second thumb segment form an exit port for optical fiber cable so that the optical fiber cable may be routed into the entry port, wound around the reel and against the outer wall so as to collect in the canister, routed into the guide track through the entry slot, wound around at least part of the guide track, routed out the exit slot, and routed out of the canister through the exit port.

In another aspect, the invention may be seen as an optical fiber cable storage and deployment device in which a substantially circular guide track is disposed on a bottom (support) surface. The guide track is formed by a substantially circular inner wall that is concentrically arranged in relation to a guide track wall. The inner wall has a diameter that is greater than the diameter of the guide track wall. An outer wall has a first lateral section, a second lateral section that is positioned opposite the first lateral section, and an intermediate section. A first arcuate corner section joins the first lateral section to the intermediate section, and a second arcuate corner section joins the intermediate section to the second lateral section. The guide wall and the inner wall define the guide track so that the guide track is dimensioned to enable continuous adjustment of optical fiber cable in the device and thereby assure that the cable will not experience bending that deviates from a predetermined minimum radius requirements.

In another aspect, an optical fiber storage and dispensing apparatus comprises a substantially planar bottom surface having juxtaposed first and second thumb segments and a finger segment disposed between the first and second thumb segments. An outer wall is affixed to and extends upwardly from at least a portion of a perimeter of the bottom surface and confines the first and second bottom thumb segments. A substantially circular inner wall, having a first diameter, is similarly affixed to the surface and extends upwardly therefrom. A substantially circular inner guide track wall is affixed to the surface and extends upward by therefrom. The guide track wall is arranged concentric to the inner wall and has a second diameter that is less than the first diameter. A top flange is joined to the bottom surface by the outer wall so that the top flange and the first thumb segment form an entry port for optical fiber cable and the top flange and the second form an exit port for optical fiber cable.

In an additional aspect, an apparatus for storing and deploying fiber optic cable comprises a substantially planar support surface having juxtaposed first and second thumb segments and a finger segment disposed between segments and extending beyond the thumb segments; an outer wall extending upward from the support surface and positioned about at least a portion of the perimeter of the support surface including and extending between the thumb segments; and concentric means positioned about a center of the support surface for storing and deploying fiber optic cable in a coiled manner that enables continuous control, within predetermined limits, of a radius that characterizes the degree to which the fiber optic cable is coiled.

In yet another embodiment, an optical fiber storage device for providing continuous adjustment of optical fiber cable comprises a substantially planar support surface having juxtaposed first and second thumb segments and a finger segment extending beyond the thumb segments; a first outer wall; a first top flange joined to the support surface by the first outer wall; a second outer wall; a second top flange joined to the support surface by the second outer wall; and a guide track disposed on the support surface for storing and deploying fiber optic cable in a reeled manner so that continuous control, within predetermined limits, may be maintained of the bending radius of the fiber optic cable.

Embodiments of the optical fiber cable storage and deployment device may, in one approach, be fabricated according to a process that comprises molding a first portion of the canister in a manner that forms:

(i) a substantially planar base having juxtaposed first and second thumb segments, a finger segment disposed between the thumb segments and extending beyond the thumb segments, and having a bottom perimeter extending between extremities of the thumb segments;

(ii) an outer wall extending upwardly from the bottom perimeter and having a plurality of alignment holes;

(iii) a substantially circular inner wall disposed at about the center of the planar base and extending upwardly therefrom and having a first diameter;

(iv) a substantially circular guide track wall extending upwardly from the planar surface, arranged concentric to the inner wall and having a second diameter that is less than the first diameter;

(v) a longitudinal fiber channel, disposed at an extremity of the finger segment of the planar base, for routing optical fiber cable linearly through the canister, the fiber channel formed from a first lateral wall comprising a plurality of alignment detents and a second lateral wall comprising a plurality of alignment holes;

aligning the first portion of the optical fiber storage and deployment canister on a welding apparatus;

aligning a first top flange segment to the first portion through the alignment tabs in the first top flange segment and the alignment detents in the first lateral wall;

welding the first top flange segment to the first portion;

aligning a second top flange segment to the first portion; and welding the second top flange segment to the first potion.

Another manifestation of the invention may be apprehended in a method of routing optical fiber cable between two points of connection using an optical fiber cable storage and deployment canister that comprises an entry port, an exit port, a guide track having an entry slot and an exit slot, an outer wall and a bifurcated transverse barrier that defines a cable channel. The method comprises:

(a) directing the optical fiber cable into the canister through the entry port;

(b) accumulating a length of the cable in the canister by winding the cable around an exterior guide track wall in an area of the canister circumscribed by the outer wall and the bifurcated lateral wall;

(c) directing cable into the guide track through the entry slot;

(d) directing cable around at least part of the guide track;

(e) directing cable out of the guide track through the exit slot; and (f) directing cable out of the canister through an exit port.

Vertical travel of the cable in the guide track is restrained by dressing the cable in the guide track below a plurality of retention tabs that extend radially outward at upper positions on the exterior guide track wall. Two such canisters may be positioned side-by-side, and a connection may be made between two points by routing the cable through the first canister as described immediately above and, upon exit from the first canister, directing the cable through the cable channel in the second canister to the second point of connection.

BRIEF DESCRIPTION OF THE DRAWINGS

The present invention may be better understood, and its numerous objects, features, and advantages made apparent to those skilled in the art by referencing the accompanying Drawings, wherein.

The use of the same reference symbols in different Drawings indicates identical items, unless otherwise noted.

DETAILED DESCRIPTION

For a thorough understanding of the subject invention, including the best mode contemplated for practicing the invention, reference may be had to the following Detailed Description, including the appended Claims, in connection with the above-described Drawings. It should be recognized, however, that the Detailed Description is intended to be illustrative and not exhaustive and is presented as a vehicle to convey an understanding of the invention, and not as a vehicle to circumscribe or unduly limit the scope of the invention.

As intimated above, the invention addresses problems associated with the storage and deployment of optical fiber cable in telecommunication and other systems. In such systems, there is often encountered a need for a device to accumulate and deploy optical fiber cable between two or more points of termination. This need is exacerbated by numerous variables associated with the nonstandard lengths of cables distributed by vendors, differences in the configurations of requirements with which the cable is to be used, and surprises in the installation environments. The need is further exacerbated by the sensitivity of optical fiber cable performance to the manner in which the fiber is physically arranged and, in particular, to performance degradations that result from severe bending radii that may be imposed on the cable.

The subject invention addresses these concerns in a device for storing and deploying optical fiber cables. The device includes a support surface on which there is formed a circular guide track with entry and exit slots for cable. The guide track is formed by a substantially circular inner wall that is concentrically arranged in relation to a guide track wall. The inner wall has a diameter that is greater than the diameter of the guide track wall. An outer wall has a first lateral section, a second lateral section that is positioned opposite the first lateral section, and an intermediate section. A first arcuate corner section joins the first lateral section to the intermediate section, and a second arcuate corner section joins the intermediate section to the second lateral section. The guide wall and the inner wall define the guide track so that it is dimensioned to enable continuous adjustment of optical fiber cable in the device and thereby assure that the cable will not experience bending that deviates a predetermined minimum radius requirement. A detailed rendition of an embodiment of the invention may be found in FIGS. 1A and 1B.

Figure 1A:
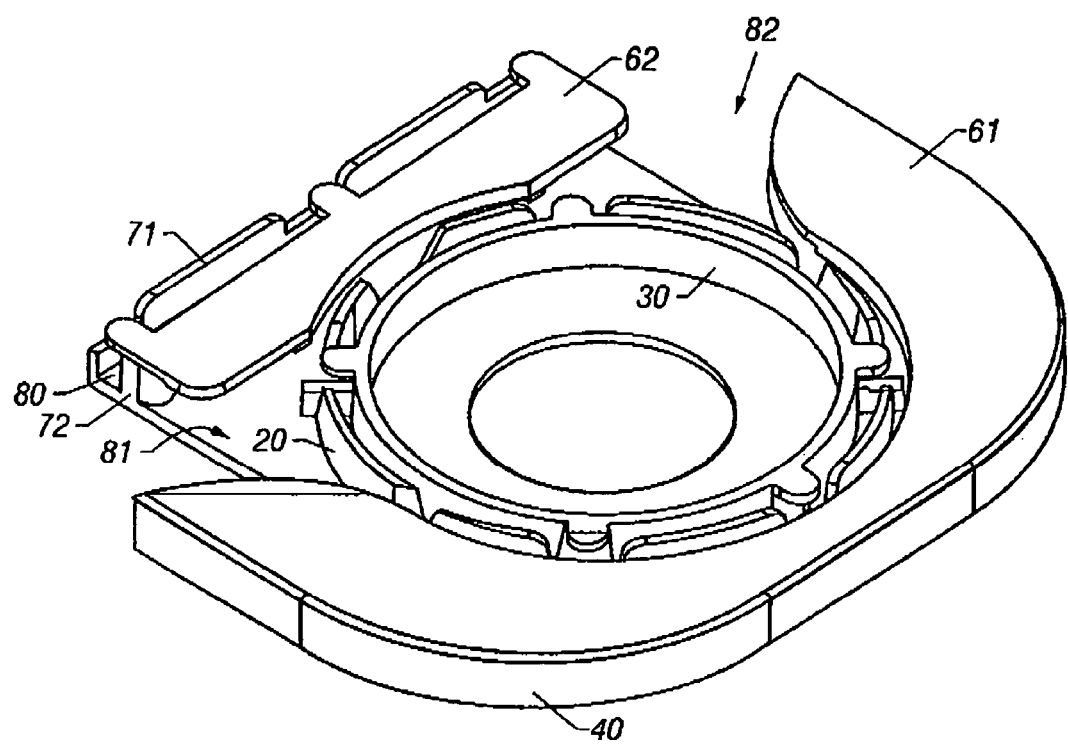
FIG. 1A is an isometric view of a fully assembled optical fiber cable storage and deployment canister, in which specifically identified are a fiber channel 80, a cable entry port 81, and a cable exit port 82.
Figure 1B:
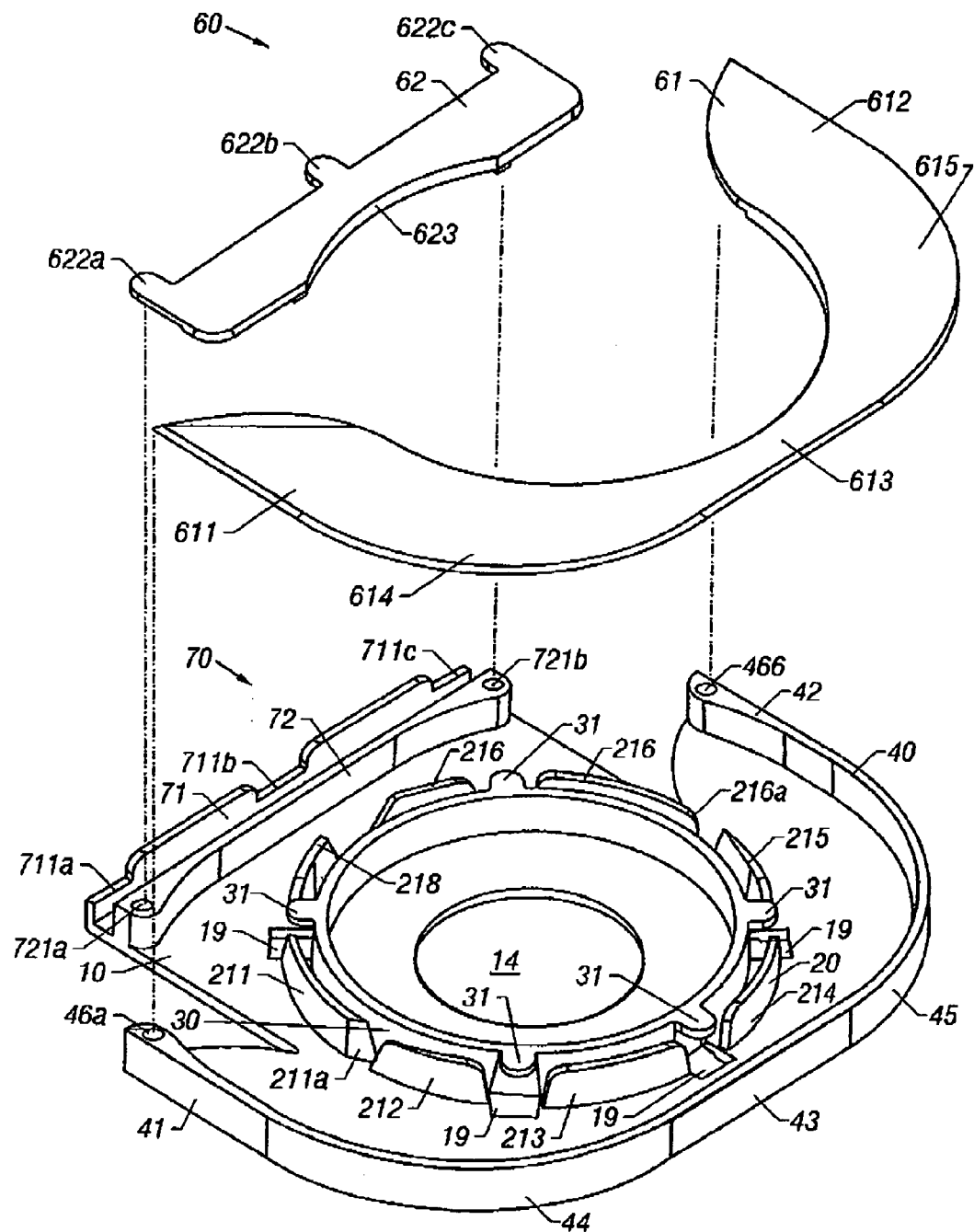
FIG. 1B is an exploded view of the optical fiber cable storage and deployment canister.

FIG. 1A is an isometric view of a fully assembled embodiment of a device for storing and deploying optical fiber cable in a manner that enables continuous adjustment of the manner in which an indeterminate length of cable may be wound or coiled about a reel for a storage in the device. FIG. 1B is an exploded view of the device.

Figure 1C:
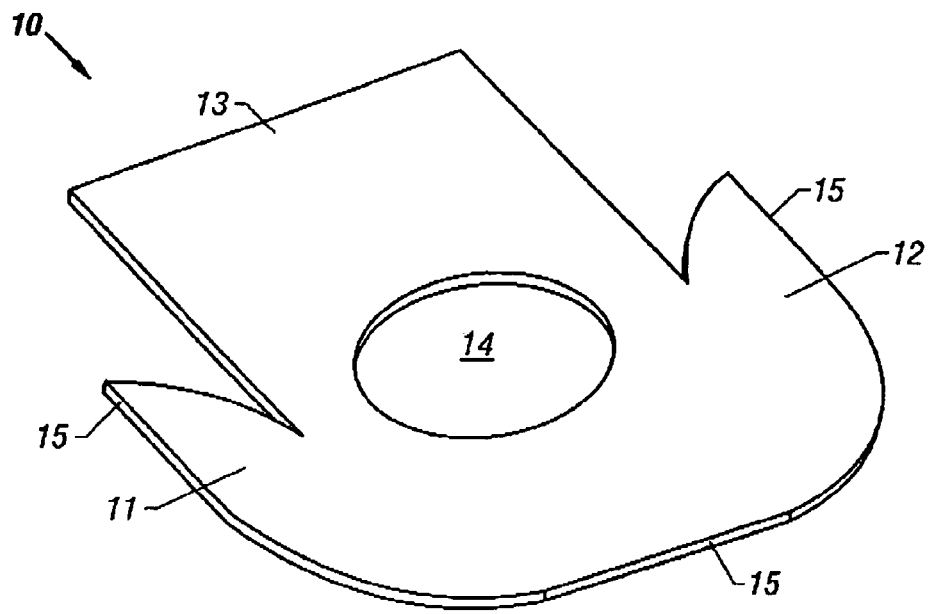
FIG. 1C is an isometric view of a planar support surface, or base 10, from which may easily be seen thumb segments 11 and 12, intervening finger segment 13, stacking aperture 14, and bottom perimeter 15.

As may be seen from FIG. 1B, the device includes a substantially planar bottom support surface 10 on which are disposed an inner wall 20 and a guide track wall 30. Support surface 10 is more clearly depicted in FIG. 1C, from which it may be seen that support surface 10 includes a first thumb segment 11 and a second thumb segment 12. Thumb segments 11 and 12 are respectively juxtapositioned on diametrically opposite sides of a circular orifice 14. Orifice 14 is located at a generally central position on support surface 10. A finger segment 13 is positioned between thumb segments 11 and 12, and extends in a direction away from a bottom perimeter 15 of the support surface 10. As may be seen in FIG. 1C, finger segment 13 extends beyond thumb segments 11 and 12.

Referring again to FIG. 1B, the subject device also includes an outer wall 40 that extends the length of bottom perimeter 15 of surface 10, between the extremities of thumb segments 11 and 12. Outer wall 40 may be identified as comprising a first lateral section 41, a second lateral section 42 and an intermediate (between lateral sections 41 and 42) section 43. First lateral section 41 is joined to intermediate section 43 by a first arcuate section 44; and second intermediate section 43 is joined to second lateral section 42 by a second arcuate section 45. As is suggested by FIG. 1B, outer wall 40 extends upwardly from, and substantially orthogonally to, support surface 10.

With continuing reference to FIG. 1B, the device also includes an inner wall 20 and a guide trace wall 30. Inner wall 20 and guide track wall 30 are concentrically arranged about orifice 14, with inner wall 20 having a diameter that is greater than the diameter of guide track wall 30. Both inner wall 20 and guide track wall 30 extend upwardly from, and substantially orthogonally to, support surface 10. Inner wall 20 and guide track wall 30 form a guide track 50 that occupies an annular area between, and that has a width roughly equal to one-half the differences between, the respective diameters of walls 20 and 30. As may be readily seen in FIG. 2, guide track 50 constitutes an annular area in which optical fiber cable may be conveniently positioned.

Guide track wall 30 exhibits a plurality (five are shown in the Drawings) of retention tabs 31 that are disposed at approximately respectively equidistant points about the upper circumference of guide track wall 30. Retention tab 31 operates to restrict vertical travel of optical fiber cable with guide track 50.

In contradistinction to guide track wall 30, which is substantially continuous in formation, inner wall 20 comprises a plurality of discrete arcs 211, 212, . . . , 218. (That is, eight arc segments are illustrated in FIG. 1B. However, the scope of the invention is not constrained to the specific number of arc segments.) In FIG. 1B, it may be seen that adjacent pairs of arc segments cooperate to alternatively form either (i) a window in the inner wall through which a retention tab 31 protrudes or (ii) a slot through which optical fiber cable can be routed either into or out of the guide track

50. Specifically, arc segment pairs (212, 213), (214, 215), (215, 216), (216, 217) and (218, 211) form apertures that correspond to respective ones of the retention tabs. Conversely, arc segment pairs (211, 212) and (217, 218) form slots through which optical fiber cable may, respectively, enter and exit the guide track. This manner of routing the optical fiber cable itself is illustrated. In order to promote ease of installation of the cable in the guide track, arc segments 211 and 216 each exhibit an end surface 211a and 216a, respectively, that is oriented obliquely to the direction of the diameter of the inner wall. Specifically, end surface 211a and arc segment 212 form an entry slot through which optical fiber cable is routed into the guide track. End surface 216a and arc segment 215 form an exit slot through which optical fiber cable may be routed out of guide track 50.

The device may be seen in FIGS. 1A and 1B to include a top flange 60 that, when installed, encloses and protects the optical fiber cable within the cable storage and deployment device. Top flange 60 is formed from two discrete flange sections 61 and 62, respectively. Flange segment 61 is contoured in a manner that conforms support surface 10 and, specifically, to bottom perimeter 15. That is, flange section 61 exhibits opposed lateral portions 611 and 612, an intermediate section 613, and arcuate joining sections 614 and 615. A deflector ring 616 is provided on the bottom surface of flange segment 61 to restrain the optical fiber cable in the canister cavity. Top flange section 61 is joined to support surface 10 through outer wall 20 at the bottom perimeter of base.

Flange segment 62 exhibits a primarily rectangular body 621, from which extend a number (3) of alignment tabs 622a, 622b, and 622c. An arc 623 is cut out of flange segment 62 in a manner that is congruent to the circumference of inner wall 30. Flange segment 62 also includes a deflector ring 624 disposed on the bottom surface of flange segment 62, around arc 623. Flange segment 62 is joined to support surface 10 through a bifurcated transverse barrier 70 that includes a first section 71 and a second section 72. Section 71 exhibits alignment detents 711a, 711b and 711c that align with alignment tabs 622a, 622b, and 622c. Segment 72 affords alignment holes 721a and 721b through which base 10 may be aligned in a welding apparatus as discussed below. The extremities of segment 72 incline inward through a curvature imparted to the inner horizontal surface of segment 72, thereby inviting the installation of optical fiber cable in the device. Bifurcated transverse barrier 70 defines a longitudinal channel 80 through which optical fiber cable may be routed.

Figure 2:
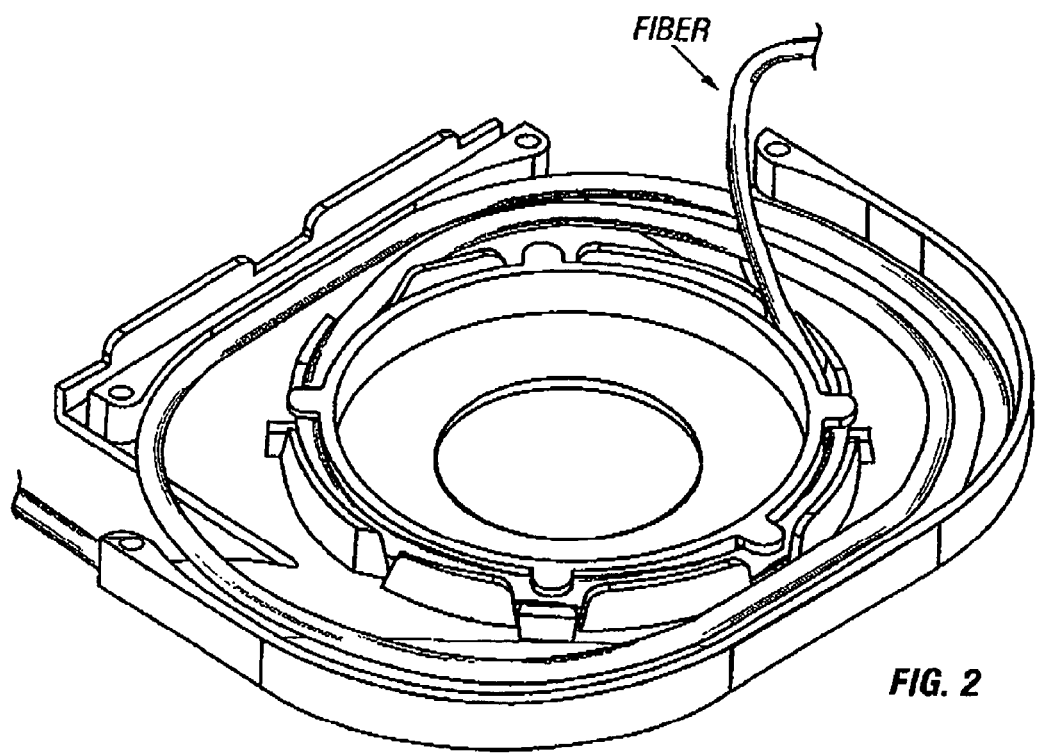
FIG. 2 is an isometric view of the optical fiber cable storage and deployment canister, with the top flange removed to reveal the manner in which cable is routed into, around, out of, and through the canister.

In a manner perhaps most easily appreciated from FIG. 1A and FIG. 2, thumb segment 11 of the support surface, lateral portion 611 of top flange segment 61, outer wall 40, and transverse retention barrier 70 form an entry port 81 for optical fiber cable. Similarly, thumb segment 12 of the support surface, lateral portion 612 of top flange segment 61, outer wall 40, and transverse retention barrier 70 form an exit port 82 for the optical fiber cable.

The optical fiber storage and deployment canister is used to route optical fiber cable between two points of connection, such as optical switches, multiplexers, digital crossconnects, and the like, in the following manner. Optical fiber cable is initially routed into the canister from a first point of connection (source) through the entry port 81 that is largely defined by first thumb segment 11 and top flange segment 61. The necessary length of cable is wound, for example, in a counter-clockwise direction around the reel that is formed by inner wall 20. When a sufficient length of cable has been coiled around inner wall 20 so as to accumulate in the cavity area of the canister (that is, the area) between inner wall 20 and, at one end, outer wall 40 and, at the opposite end, bifurcated transverse barrier 70), the cable is directed into guide track 50 through the entry slot formed by end surface 211a and arc segment 212. The cable is then dressed around guide track 50, under retention tabs 31, preferably less than one full rotation. The optical cable is then directed out of guide track 50 through the exit slot formed by surface 216a and segment 215. (The above description assumes, for simplicity, that cable is wound in the canister in a counter-clockwise direction. Clearly, in some installations, which may or may not include multiple canisters, cable may be wound in an opposite, or clockwise, direction around and in the guide track. In this situation, end surface 216a and arc segment 215 would constitute the entry slot, and end surface 211a and arc segment 212 would constitute the exit slot. The entry and exit ports would similarly reverse roles.) The cable is routed out of the canister, in the direction of the second connection point (termination), through the exit port 82 that is defined by second thumb segment 12 and top flange segment 61.

From the above, it should be apparent that the subject optical fiber storage and deployment canister enables continuous adjustments in the length of cable that may be stored in the canister by enabling a continuously variable length of cable to be stored in and, as needed, withdrawn from the canister. The reel formed by inner wall 20 assures that minimum bend radius requirements are not violated. The guide track 50, together with entry slot (211a, 212) and exit slot (216a, 215) cooperate to terminate the cable in the canister and to provide strain relief.

As suggested above, the canister is readily useable in numerous installation configurations. In some installation, canisters may be installed in a side-by-side relationship. Often this orientation results in cable being wound in one direction (e.g. counter-clockwise) in the first canister and in the opposite direction (e.g. clockwise) in the second canister. Alternatively, optical fiber cable may be accumulated and stored in the first canister, as in the manner described above, and directed linearly through the second canister through its respective cable channel 80. In addition, a number of canisters may be vertically stacked in accordance with the installation arrangement depicted in FIGS. 3A and 3B. In this configuration, individual canisters are positioned on a stacking post through the central aperture 14 that is cut out of base 10.

The design of subject optical fiber storage and deployment canister is susceptible to convenient, efficient and cost-effective fabrication. The fabrication process may be performed by injection molding of a major portion of the canister that includes (i) the planar base, so as to form, inter alia, the thumb and finger segments, (ii) the outer wall, (iii) the bifurcated transverse barrier and associated fiber channel, and (iv) the reel portion, including guide track wall with retention tabs and segmented inner wall. In this regard, a number of rectangular cut-outs 19 are provided in the planar surface to facilitate formation, by injection molding, of retention tabs 31. In addition, and as may easily be seen in FIG. 1B, alignment holes 721a and 721b are provided in segment 72 of the transverse barrier, and alignment holes 46a and 46b are provided at the ends of the outer wall 40. The alignment holes are used to effect alignment of the canister base to an ultrasonic welding apparatus. Once the base is aligned on the welding apparatus, flange segment 61 is aligned on transverse barrier 70 through alignment tabs 622a, 622b, and 622c and alignment detents 711a, 711b and 711c. Alignment of top flange segment 71 enables a convenient ultrasonic weld to transverse barrier 70. Similarly, alignment of top flange segment 62, enables a convenient sonic weld to outer wall 20.

Figure 3A:
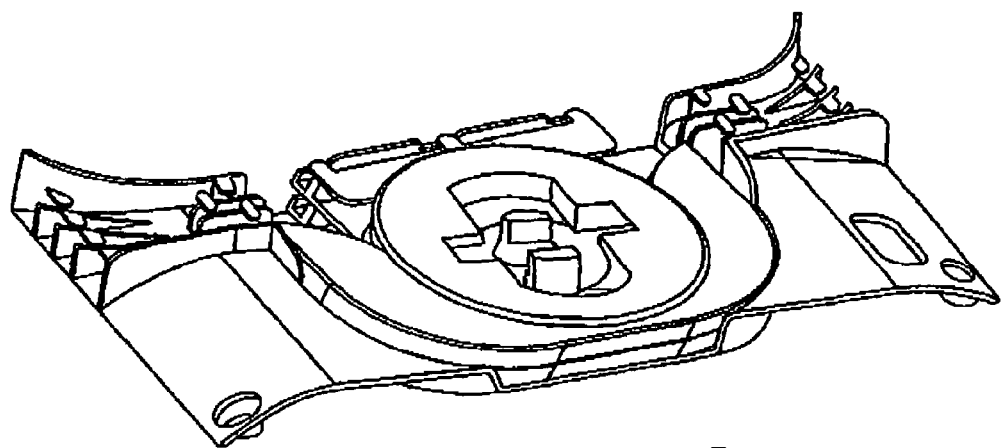
FIGS. 3A and 3B illustrate the manner in which two or more canisters may be stacked.
Figure 3B:
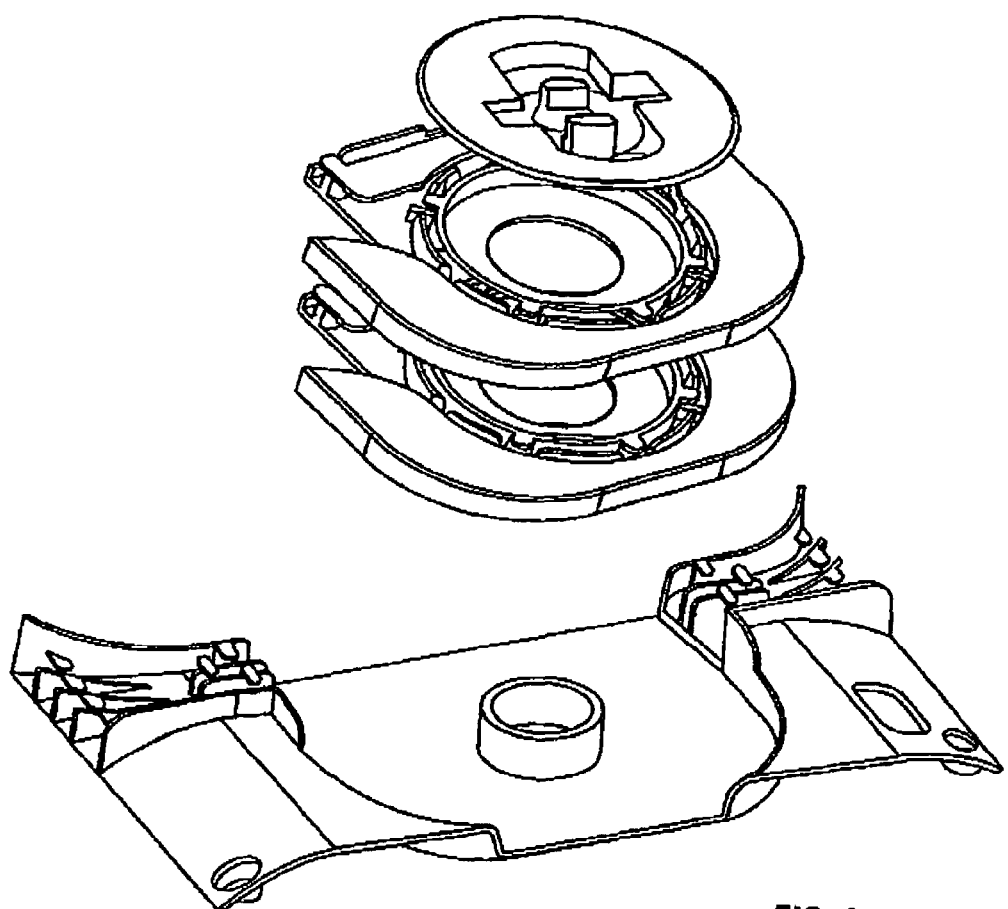
Figure 3C:
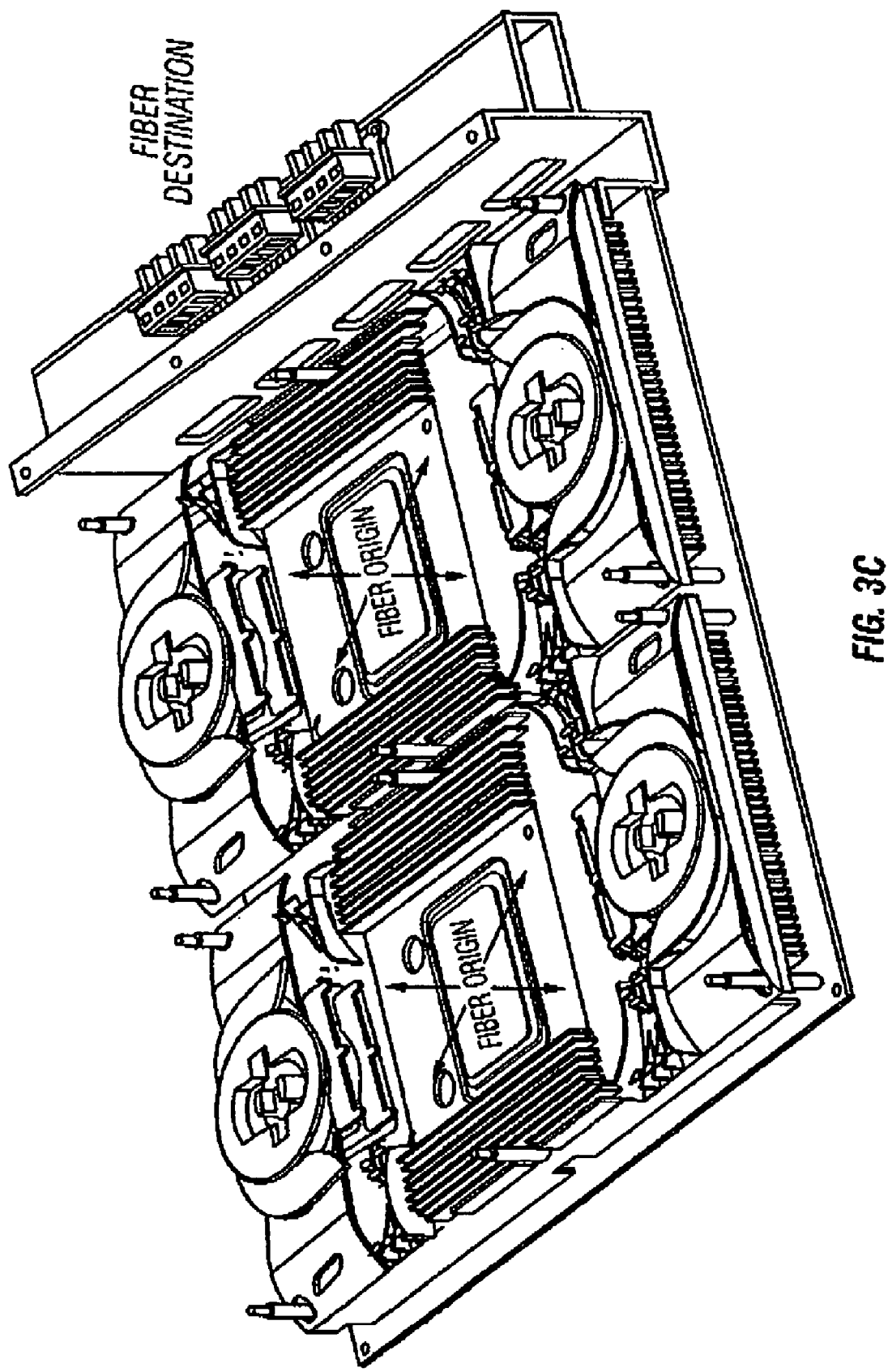
FIG. 3C illustrates an assembly of four (4) canisters.

FIGS. 3A, 3B and 3C depict examples of the manner in which the subject optical fiber cable storage and deployment canister may be configured in an installation environment. FIGS. 3A and 3B (an exploded view) demonstrate the manner in which two or more canisters may be stacked. FIG. 3C demonstrates the arrangement of four (4) canisters at respective quadrants of an installation tray.

Referring now to FIGS. 3A and 3B, and specifically to FIG. 3B, there is depicted a configuration in which two canisters 101 and 102 may be stacked on a base assembly 103. Base assembly 103 is designed to provide a stacking post 1031 that protrudes from a recessed basin 1032 in base assembly 103. Basin 1032 is dimensioned to be congruent with the perimeters of canisters 101 and 102, so that the canisters may be deposited in basin 1032 by the lowering canisters onto stacking post 1031 through the respective central apertures 14 in the canisters. Once positioned on stacking post 1031, the canisters are secured in place by a locking mechanism 104. Locking mechanism 104 has generally disc-like form, with a circular perimeter that aligns with top flange segments 61 and 62 of the uppermost canister. Locking mechanism 104 is secured in place by the operation of a pair of resilient tines 1041 and 1042 that extend downwardly into the interior wall of stacking post 1031. In order to engage locking mechanism 104, tines 1041 and 1042 are manually compressed inwardly, the locking mechanism is secured over the canisters, and the tines are released. When released, the tines recover to snap fit onto stacking post 1031.

Other salient aspects of base assembly 103 include a pair of lateral wing members 1033a and 1033b that extend from opposite sides of recessed basin 1032. Because in at least one embodiment, base assembly 103 is intended to be mounted on a heat sink (not shown) associated with telecommunication equipment, such as an optical switch (also not shown), wing members are displaced upwardly form the surface of recessed basin 1032, and may in fact be somewhat concave in from, so to promote air flow from the heat sink through the base assembly. Also evident from FIG. 3B, base assembly affords, at opposite upper corners, a pair of cable guides 1034a and 1034b. Each of the cable guides offers a number of fiber channels that direct optical fibers into the canisters.

FIG. 3C depicts a configuration in which four (4) canisters may be installed at respective corners of a tray.

Accordingly, while particular embodiments of the present invention have been shown and described, it will be recognized to those skilled in the art that, based upon the teachings herein, further changes and modifications may be made without departing from this invention and its broader aspects, and, therefore, the appended Claims are to encompass within their scope all such changes and modifications as are within the true spirit and scope of this invention. For example, although the invention has been described with reference to the storage and deployment of optical fiber cable, understand that the emphasis on optical fiber cable is merely a pedagogical convenience. Those skilled in the art will appreciate that the subject cable storage and deployment device is inherently applicable to use with numerous types of conductors, or for the storage and deployment of items that are not conductors of optical or electrical signals.

What is claimed is:

1. A cable fiber storage and deployment canister comprising:
    a substantially planar base having a first thumb segment, a second thumb segment, and a finger segment disposed between the first and the second thumb segments and extending beyond the extremities of the thumb segments, the base exhibiting a bottom perimeter that extends between the respective extremities of the first and second thumb segments;
    an outer wall extending upwardly along the bottom of the base;
    a bifurcated transverse barrier extending transversely across the finger segment at an end of the finger segment;
    a reel disposed at about a center position on the base, the reel comprising:
        a first substantially circular guide track wall having a first diameter;
        a second substantially circular guide track wall arranged concentric to the first guide track wall and having a second diameter that is greater than the first diameter; and
        a guide track defined by the first and second guide track walls and having an entry slot and an exit slot; and
    a top flange comprising a first flange segment joined to the bifurcated transverse barrier and a second flange segment joined to the outer wall, wherein the top flange and the first thumb segment form an entry port for cable and the top flange and second thumb segment form an exit port for cable so that the cable may be routed into the entry port, wound around the reel so as to collect in the canister, routed into the guide track through the entry slot, wound around at least part of the guide track, routed out the exit slot, and routed out of the canister through the exit port.

2. An apparatus for storing and deploying cable, the apparatus comprising:
    a substantially planar support surface having juxtaposed first and second thumb segments and a finger segment disposed between the first and the second thumb segments and having a distal portion extending beyond the first and the second thumb segments;
    an outer wall extending upward from the support surface and positioned about at least a portion of a perimeter of the support surface including and extending between the thumb segments;
    a substantially circular inner wall having a first diameter, the inner wall being segmented, the inner wall being affixed to the support surface;
    a substantially circular guide track wall having a second diameter smaller than the first diameter, the guide track wall being concentric with the inner wall, the guide track wall being substantially continuous, the guide track wall being affixed to the support surface; and
    a longitudinal cable channel disposed at the distal portion of the finger segment for routing cable linearly through the apparatus.

3. An apparatus for storing and deploying cable as defined in claim 2, further comprising:
    a top flange joined to the bottom surface by the outer wall so that the top flange and the first thumb segment define an entry port for the cable and the top flange and the second thumb segment define an exit port for the cable.

4. An apparatus for storing and deploying cable as defined in claim 3, wherein the outer wall comprises:
- a first lateral section;
- a second lateral section, opposed to the first lateral section;
- an intermediate section;
- a first arcuate corner section joining the first lateral section and the intermediate section; and
- a second arcuate corner section joining the intermediate section and the second lateral section.

5. An apparatus for storing and deploying cable as defined in claim 3, wherein the inner wall comprises a plurality of segments including a first pair of adjacent segments that define an entry slot and a second pair of adjacent segments that form an exit slot.

6. An apparatus for storing and deploying fiber optic cable as defined in claim 5, wherein the entry slot and the exit slot are oblique to the first diameter of the inner wall.

7. A cable storage and deployment device for providing continuous adjustment of optical fiber cable, the device comprising:
- a substantially planar support surface having juxtaposed first and second thumb segments and a finger segment extending beyond the first and the second thumb segments;
- a first outer wall, comprising:
  - a first lateral section;
  - a second lateral section, opposed to the first lateral portion;
  - an intermediate section;
  - a first arcuate corner section joining the first lateral section and the intermediate section; and
  - a second arcuate corner section joining the intermediate section and the second lateral section;
- a first top flange segment joined to the support surface by the first outer wall;
- a second outer wall;
- a second top flange segment joined to the support surface by the second outer wall; and
- a guide track disposed on the support surface for storing and deploying cable in a reeled manner so that continuous control, within predetermined limits, may be maintained of the bending radius of the cable, the guide track comprising:
  - a substantially circular guide track wall having a first diameter, the guide track wall affixed to the support surface and extending orthogonally therefrom; and
  - a substantially circular inner wall affixed to the support surface and extending orthogonally therefrom, the inner wall arranged concentric to the guide track wall and having a second diameter that is greater than the first diameter of the guide track wall.

8. A cable storage and deployment device for providing continuous adjustment of cable as defined in claim 7, wherein the first top flange and the first thumb segment of the support surface form an entry port for cable and the second top flange and the second thumb segment of the support surface form an exit port for cable.

9. A cable storage and deployment device for providing continuous adjustment of cable as defined in claim 7, wherein the inner wall comprises a plurality of segments, including a first pair of adjacent segments that define an entry slot and a second pair of adjacent segments that define an exit slot.

10. A cable storage and deployment device for providing continuous adjustment of cable as defined in claim 9, wherein the entry slot and the exit slot are oblique to the second diameter of the inner wall.

11. A cable storage and deployment device for providing continuous adjustment of cable as defined in claim 7, wherein the guide track wall comprises means for restraining movement of a cable.

12. A cable storage and deployment device for providing continuous adjustment of cable as defined in claim 11, wherein the means for restraining movement of a cable includes retention tabs extending radially from the circumference of the guide track wall at upper positions of the guide track wall.

13. An apparatus for storing and deploying cable as defined in claim 2, wherein the longitudinal cable channel extends the width of the finger segment and is defined by a first transverse wall and a second transverse wall, the first and the second transverse walls extending in a mutually parallel orientation substantially orthogonal to the plane of the finger segment.

14. An apparatus for storing and deploying cable as defined in claim 13, wherein:
- the first transverse wall comprises a plurality of alignment detents for a top flange; and
- the second lateral wall comprises one or more alignment features for welding the top flange.

15. An apparatus for storing and deploying cable as defined in claim 2, wherein the support surface defines a substantially circular aperture that enables the apparatus to be stacked on a stacking post.

16. An apparatus for storing and deploying cable as defined in claim 15, wherein the longitudinal cable channel extends the width of the finger segment and is defined by a first transverse wall and a second transverse wall, the first and the second transverse walls extending in a mutually parallel orientation substantially orthogonal to the plane of the finger segment.

17. An apparatus for storing and deploying cable as defined in claim 16, wherein:
- the first transverse wall comprises a plurality of alignment detents for a top flange; and
- the second transverse wall comprises at least one or more alignment features for the alignment to a welding apparatus for welding the top flange to the transverse wall.

* * * * *